Patented Apr. 6, 1954

2,674,627

UNITED STATES PATENT OFFICE 2,674,627

BICYCLIC KETONES AND METHODS OF PREPARATION THEREOF

Jack W. Ralls, William C. Wildman, Kirtland E. McCaleb, and Alfred L. Wilds, Madison, Wis., assignors to Wisconsin Alumni Research Foundation, Madison, Wis., a corporation of Wisconsin No Drawing. Application April 7, 1950, Serial No. 154,728

3 Claims. (Cl. 260—586)

The present invention relates to new chemical compounds and processes of preparing the same and its principal object is to provide improved processes of synthesizing steroid and steroid-like compounds, and intermediates thereof having utility in the hormone field.

While successful total syntheses have been accomplished for some of the aromatic steroids, notably equilenin and estrone, a total synthesis of a non-aromatic steroid containing both angular methyl groups has not yet been accomplished. Progress in this direction has been made by Robinson and his coworkers, particularly Cornforth. Cornforth and Robinson, J. Chem. Soc., 1855 (1949). These authors have described the synthesis of the tricyclic ketone I in approximately nineteen steps starting with naphthalene. Among the isomers obtained was one having the correct stereochemical configuration to correspond to that of coprostanone; this isomer was identical with one prepared by degradation of desoxycholic acid or cholesterol. Robinson and his collaborators are now endeavoring to attach ring D to intermediate I in order to synthesize compounds which might be convertible to cholesterol and related structures.

Grob and his associates Jundt and Wicki have made progress toward the goal of a synthesis of the adrenal cortical hormones having an oxygen substituent at $C_{11}$. Grob et al., Helv. Chem. Acta, 31, 1691, 1706 (1948); 32, 2427 (1949). They have described the synthesis of the tricyclic intermediate II. While the number of steps involved in the synthesis of this tricyclic ketone is significantly less than that of Cornforth and Robinson, further elaboration of structure II to a natural steroid of the adrenal cortical type will require the successful solution of a number of intricate problems.

We have discovered and elaborated a simpler route to a tricyclic intermediate having rings A, B and C of the steroid nucleus, as well as the $C_3$ substituent, the angular methyl group between rings A and B and an appropriate functional group in ring C to facilitate attachment of ring D. This key intermediate is shown in Formulas III and IV. It has been prepared by a six-step synthesis in good yield from readily available starting materials. In addition to few steps, the process is further simplified by the fact that it is unnecessary to isolate all of the intermediates. Moreover, compound III (or IV) provides significant advantages per se over the intermediates of the English or Swiss workers. The stereochemical difficulties involved in preparing I, for example, have been avoided, since III exists as a single DL pair and the additional asymmetric centers may be introduced at later states in the synthesis in ways advantageous to the formation of the correct stereoisomers for the steroids to be synthesized. This single intermediate III is suitable for the synthesis of a great variety of steroids, including the male sex hormones, the sterols, the bile acids and related compounds, the progestational hormone, adrenal cortical hormones lacking the $C_{11}$ oxygen substituent, steroidal sapogenins, cardiac aglycones, and numerous other naturally occurring steroids and compounds related to them.

Compounds III also presents a structure such that suitable protection of functional groups make it possible to introduce a $C_{11}$ substituent, either oxygen or one replaceable by oxygen, so that the $C_{11}$ oxygenated adrenal cortical hormones may be elaborated from this same intermediate. On the other hand the method of synthesis of III (or IV) is such that it may easily be modified to yield directly a derivative with a suitable $C_{11}$ substituent.

The significant key to the synthesis of the present invention is a compound of the type of the bicyclic compound X. This unusual class of compound, which may be considered a vinylog of a 1,3-diketone, has not been studied previously to any appreciable extent and could exist in at least four tautomeric forms, as indicated by formulas Xa, Xb, Xc, Xd. We have developed two general approaches to this structure X, as well as to the related compound XX, lacking the methyl group. The preferred methods for these specific compounds starts with dihydroresorcinol (VIa or VIb), which is readily available by reduction of resorcinol (V). This very reactive compound, VI, can be made to undergo condensation with ethyl vinyl ketone to give VII (a or b). Alternately, the alkylation of VI may be accomplished with the Mannich base 1-diethylaminopentanone-3 (XVI), readily prepared from propionyl chloride and ethylene via the chloro ketone XV, which is treated with diethylamine to prepare XVI itself, or with other secondary amines to obtain analogous amino ketones. The methiodide of the Mannich base XVI will react with VI in the presence of piperidine to give the same alkylated derivative VII. Numerous modifications and variations are possible for this step and some of these are illustrated below.

Intermediate VII can be readily cyclized as the enol methyl ether VIII, which can be prepared in good yield using diazomethane. Other methods may be used for preparing the enol ether and other blocking groups may be employed. Treatment of the enol ether VIII with methanolic sodium methoxide gives the cyclic enol ether IX, which is hydrolyzed with acid to the ketone X. Numerous other alkaline reagents may be used to cyclize VIII and acidic reagents to hydrolyze or cleave IX.

The intermediate X for the present synthesis has two of the carbons adjacent to the ketone groups activated because of the effect of the other ketone group as transmitted through the double bond. These two activated carbon atoms 8a and 5 (corresponding to structures Xb and Xc) could lead to mixtures, as could the less activated carbons 2 and 7, so that the structure X represents a complex situation. Nevertheless, we have discovered that it is possible to carry out the synthesis in such a way as to get the triketone XI, which is readily cyclized with alkaline reagents to the important tricyclic diketone III (or IV). The examples described below illustrate representative procedures only, as various modifications thereof will be apparent to those skilled in the art.

Application of similar steps to dihydroresorcinol using methyl vinyl ketone or the methiodide of 1-diethylaminobutanone-3 gives the alkylated derivative XVII (a or b) which is converted to the enol methyl ether XVIII, cyclized to XIX and hydrolyzed to XX (a, b, c, d). This derivative of X is converted as indicated above with reference to X to give a structure similar to III but lacking the angular methyl group.

This route to the intermediate bicyclic compounds X and XX involves the attachment of ring B to a preformed ring C.

2-γ-ketobutyl-1,3-cyclohexanedione
(XVII or XVIIb)

1-a. METHYL VINYL KETONE PROCEDURE

In a 500-ml. round-bottomed flask equipped with a dropping funnel, nitrogen inlet and calcium chloride drying tube was placed 22.4 g. (0.20 mole) of dihydroresorcinol VIa ("Organic Syntheses," vol. 27, page 21) and the apparatus was swept free of air, with a current of nitrogen. A solution of 14.0 g. (0.20 mole) of freshly distilled methyl vinyl ketone (stabilized with hydroquinone) in 40 ml. of purified dioxane (Fieser, "Experiments in Organic Chemistry," 2nd edition, D. C. Heath and Co., 1941, page 368) was added and the mixture cooled in an ice bath. A solution of 4.0 ml. of purified piperidine (distilled from sodium) in 100 ml. of dry, thiophene-free benzene was added dropwise over a period of ten minutes. After one hour, the ice bath was removed and the suspension kept at room temperature for an additional twenty-six hours. The dark red reaction mixture was poured into 100 ml. of 1 N hydrochloric acid, the benzene layer was separated and the water layer extracted with four 100 ml. portions of chloroform. The combined benzene-chloroform extracts were washed with two 50 ml. portions of saturated sodium chloride solution, dried over anhydrous sodium sulfate and the solvent removed under reduced pressure. The residual oil was distilled from a short Claisen-type flask with a wide side-arm, and the material distilling at 134–148° (0.5–1.0 mm.) was collected. This light yellow, viscous oil, $n_D^{25}$ 1.5377 solidified upon scratching with a spatula giving a solid melting at 88–98°. Recrystallization from a mixture of ether and petroleum ether gave material melting at 104–105.5°. This solid was readily soluble in water and gave an intense purple color with aqueous ferric chloride solution, indicating it to consist largely, if not completely, of the enolic form of the desired 2-substituted -1,3-cyclohexanedione. The ultraviolet absorption spectrum in 95% ethanol showed a maximum at 261 mμ (log $E$=4.17, where E is the molar extinction coefficient). In this example and the following examples, all temperatures are given as °C.

1-b. 1-DIETHYLAMINOBUTANONE-3 METHIODIDE PROCEDURE

In a 500-ml., three-necked, round-bottomed flask equipped with a sealed stirrer, dropping funnel and reflux condenser to which was attached a calcium chloride drying tube, was placed 18.5 g. (0.13 mole) of 1-diethylaminobutanone-3. Wilds and Shunk, J. Am. Chem. Soc., 65, 471 (1943). Then while cooling the flask in an ice bath 18.5 g. (0.13 mole) of cold methyl iodide was added in portions over a ten-minute period with stirring. After an additional forty-five minutes in the cold and forty-five minutes at room temperature, some dry, thiophene-free benzene was added and then decanted. To the methiodide was added 14.5 g. (0.13 mole) of dihydroresorcinol and 20 cc. of dry benzene. The air in the apparatus was replaced by nitrogen and a solution of 2.9 ml. of purified piperidine in 20 ml. of dry benzene was added at room temperature while stirring. After stirring at room temperature for two hours the red solution had become homogeneous and the mixture was allowed to stand at room temperature for a total of twenty-three hours. The reaction mixture was then poured into 120 ml. of 1 N hydrochloric acid, the benzene layer separated and the water layer extracted with several portions of chloroform. The combined organic layers were washed with two portions of saturated salt solution (which were re-extracted), dried over sodium sulfate and the solvents removed under reduced pressure. The residual oil was distilled to give a viscous, orange oil, boiling in the range 135–152° at 0.3–0.15 mm. This material, which tended to solidify on standing, was suitable for use in the subsequent reactions.

3-methoxy-2-γ-ketobutyl-2-cyclohexen-1-one
(XVIII)

2-a. FROM CRYSTALLINE 2-γ-KETOBUTYL-1,3-CYCLOHEXANEDIONE (OR ITS ENOL FORM)

To 2.73 g. of crystalline material XVII was added in portions an ethereal solution of diazomethane with swirling and cooling until an excess of the reagent was present and persisted (in one run 0.02 mole of diazomethane was employed and the mixture was kept in an ice bath for several hours and then at room temperature for eight hours). The solution was filtered to remove a trace of solid, the ether was removed by distillation and the residual light yellow liquid methoxy derivative XVIII, was distilled to give a light yellow liquid boiling at 138–140° (0.4 mm.), $n_D^{25}$ 1.5190 to 1.5197. The compound was readily soluble in water and gave no immediate coloration with aqueous ferric chloride solution; after ninety seconds this solution was a faint purple and upon longer standing developed the brilliant purple color characteristic of the material before methylation with diazomethane. A solution of the methoxy derivative in 95% ethanol gave an absorption maximum at 265 mµ (log $E=4.24$).

2-b. FROM DIHYDRORESORCINOL WITHOUT ISOLATION OF INTERMEDIATES

Dihydroresorcinol (29 g.) was converted to the 2-γ-ketobutyl derivative XVII as described above in procedure 1-b, except the product was not purified by distillation. After removal of the solvent from the extracts of the reaction mixture, about 34.9 g. of material remained. To 17.6 g. of this material in 100 ml. of ether was added with cooling and in portions the ethereal solution of diazomethane prepared from 60 g. of N-nitroso-N-methylurea by the procedure described, for example, in "Organic Reactions," John Wiley and Sons, 1942, vol. 1, page 50. After the initial vigorous reaction the evolution of nitrogen subsided gradually, and the solution was allowed to come to room temperature overnight. Then it was filtered and the solvent was removed from the filtrate, finally under reduced pressure, leaving 18 g. of product as a red oil, which was distilled twice to give 3.74 g. of lower boiling material, B. P. 68–120° (0.6–0.1 mm.), presumably containing the enol methyl ether of dihydroresorcinol (see below). 0.5 g. of an intermediate fraction and 7.38 g. of the desired product XVIII as an orange oil, B. P. 125–137° at 0.1 mm., $n_D^{25}$ 1.5214–1.5216. This material gave no immediate color with ferric chloride solution but developed a purple color after standing with the reagent. In 95% ethanol the material gave an absorption maximum at 265 mµ (log $E=4.23$).

3-methoxy-2-cyclohexen-1-one (enol methyl ether of dihydroresorcinol XII

To 5.6 g. of dihydroresorcinol was added in portions with swirling and cooling an ethereal solution of diazomethane. The solid dissolved with vigorous evolution of nitrogen, and the addition of diazomethane was stopped when a persistent yellow coloration was obtained. After standing for two hours at room temperature, the solution was filtered, concentrated and the residual oil was distilled to give a pale yellow liquid boiling at 68–71° (0.3 mm.), $n_D^{25}$ 1.5112–1.5118. Redistillation gave a practically colorless liquid, B. P. 65–67° at 0.1 mm., $n_D^{25}$ 1.5118–1.5120. This compound was moderately soluble in water and gave no immediate coloration with aqueous ferric chloride solution; upon standing this solution developed the red color characteristic of dihydroresorcinol in aqueous ferric chloride solution. The methoxy derivative in 95% ethanol gave an absorption maximum at 248 mµ (log $E=4.21$).

1-methoxy-6-keto-2,3,4,6,7,8-hexahydronaphthalene XIX and $\Delta^{4a-5}$ (or 4a–8a)-octalin-1,6-dione (XXB or XXC or the enolic forms XXa or XXd)

A methanol solution (310 ml. total volume) containing 7.5 g. of 3-methoxy-2-γ-ketobutyl-2-cyclohexen-1-one and 35 g. of sodium methoxide (2 M with respect to this reagent) was allowed to stand for nine and one-third hours at room temperature; the ultraviolet absorption spectrum of the solution developed a strong maximum at 335 mµ (determined after neutralization) as the cyclization proceeded. At the end of this time the bright red reaction mixture which contained 1-methoxy-6-keto-hexahydronaphthalene XIX was poured into a cold mixture of 1000 ml. of water and 100 ml. of concentrated hydrochloric acid. After standing for fourteen hours at room temperature to hydrolyze the enol methyl ether, the light orange suspension was extracted with three portions of chloroform. The combined extracts were washed with two portions of water and dried over anhydrous sodium sulfate. The solvent was removed and the residual product distilled under reduced pressure to obtain a pale yellow liquid, B. P. 112–118° at 0.1 mm., $n_D^{25}$ 1.5367–1.5436. This product was a mixture containing the enolic forms of the octalindione as well as the keto isomers of the latter. Upon standing this oil deposited crystals. The ultraviolet absorption spectrum of the oil in 95% ethanol exhibited maxima at 248 mµ (log $E=3.91$) and 342 mµ (log $E=3.27$).

Reaction of the octalin-1,6-dione (XXb or XXc, etc.) with 1-diethylaminobutanone-3. Methiodide 3-a. POTASSIUM ETHOXIDE METHOD A coating of crystalline 1-diethylaminobutanone-3 methiodide was prepared in a 200-ml. flask, equipped with a dropping funnel and nitrogen inlet, employing 2.62 g. (0.018 mole) of 1-diethylaminobutanone-3 and 2.60 g. (0.018 mole) of methyl iodide. The air in the flask and dropping funnel was replaced with nitrogen and 2.5 g. (0.0152 mole) of the octalin-1,6-dione in 20 ml. of dry thiophene-free benzene was added. The mixture was cooled in an ice bath and a solution of potassium ethoxide prepared from 1.0 g. (0.026 mole) of potassium in 20 ml. of dry ethanol was added over a six-minute period. The mixture was swirled in an ice bath until all the methiodide had reacted (fifty minutes), then the reaction mixture was kept at room temperature for one and one-quarter hours, and finally heated under reflux for one-half hour. The solution turned to a deep red color during the heating period. The solution was cooled and acidified with 50 ml. of 2 N sulfuric acid. After the addition of 30 ml. of water, the layers were separated and the aqueous phase extracted with three portions of benzene. The combined extracts were washed with water, dilute sodium thiosulfate, and water. The benzene solution was dried over anhydrous sodium sulfate and concentrated at reduced pressure. The residue was a viscous red orange oil. A portion of this material was evaporatively distilled, some material distilling readily at 130–140°/0.2 mm. as a pale yellow liquid. Another fraction was collected at 140–180°/0.2 mm. A small third fraction distilled at 180–210°/0.1 mm. The major portion of the material remained as a residue.

The lemon yellow aqueous phase after benzene extraction was extracted with two portions of chloroform, and the aqueous washings of the benzene extracts were extracted with one portion of chloroform. These combined chloroform extracts were washed with one small portion of water. After drying with sodium sulfate and removal of the solvent, a tacky gum was obtained. Trituration with dry ether containing a trace of ethanol gave a light colored amorphous solid. This material melted at 154–170° and gave negative tests for nitrogen. The material was moderately soluble in water and gave no color with aqueous ferric chloride. Crystallization from methyl ethyl ketone gave a product melting at 191–201°. Another crystallization gave a solid melting at 206–207°. A solution of this material in 95% ethanol showed an absorption maximum at 246 mu (log $E$=4.29).

*Anal.*—Calcd. for $C_{18}H_{22}O_3$: C, 75.48; H, 7.75. Found: C, 75.63; H, 7.77.

The filtrate and washings of the crystallization from methyl ethyl ketone were concentrated and triturated with dry ether to give a solid melting at 159–162°. Crystallization from ethyl acetate gave material melting at 164.5–166.5°. A solution of this substance in 95% ethanol gave an absorption maximum at 245 mu (log $E$=4.30).

*Anal.*—Calcd. for $C_{18}H_{22}O_3$: C, 75.48; H, 7.75. Found: C, 75.18; H, 7.63.

The various fractions of the benzene soluble material were dissolved in 30 ml. of ethanol and the solution poured into the aqueous fraction from the chloroform extraction. The orange suspension was extracted with three portions of ether, and then with three portions of chloroform. The chloroform extracts were worked up as above to yield a light yellow gum. Trituration with a mixture of ether-ethanol gave a gummy solid. A product similar to III but with a $CH_2CH_2COCH_3$ group in place of the angular methyl group has the calcd. formula $C_{18}H_{22}O_3$.

3–b. SODIUM METHOXIDE PROCEDURE UNDER MILD CONDITIONS

The air in a 100-ml., round-bottomed flask and in an attached dropping funnel was replaced with nitrogen and a solution of sodium methoxide was prepared from 0.29 g. (0.0125 mole) of clean sodium and 22 ml. of dry methanol. Addition of 2.0 g. (0.0122) of the octalin-1,6-dione gave a green solution. A solution of 1-diethyl-aminobutanone-3 methiodide (prepared from 2.05 g. (0.0137 mole) of 1-diethylaminobutanone-3 and 2.00 g. of purified methyl iodide) in 12 ml. of dry methanol was added at ice bath temperature. After four hours in the cold (occasional swirling), the green solution was kept at room temperature for twenty hours. A solution of 2 ml. of acetic acid in 10 ml. of water was added to the bright red solution, the solution shaken and diluted with 40 ml. of water. The solution was extracted with one 40-ml. and three 30-ml. portions of chloroform. The combined chloroform extracts were washed with four 40-ml. portions of 5% potassium hydroxide, and two portions of water. The chloroform solution was dried over anhydrous sodium sulfate and concentrated at reduced pressure to give a light yellow, viscous oil, i. e., III without the $CH_3$ group.

The potassium hydroxide extracts were cooled and acidified with hydrochloric acid, and the light orange solution was extracted with three 40-ml. portions of chloroform. The combined layers were washed with two portions of water, dried and concentrated at reduced pressure. A brown oil resulted, which turned to a brown gum on standing.

*1-diethylaminopentanone-3 (XVI)*

The following procedure represents a significant improvement in yield and in simplification of procedure over that of Adamson, McQuillin, Robinson and Simonsen (J. Chem. Soc., 1578 (1937), employing an improved process for preparing the intermediate 1-chloropentanone-3 (XV).

To 1000 ml. of chloroform (dried over anhydrous calcium chloride) in a 3-l, three-necked flask equipped with a mechanical stirrer, dropping funnel and calcium chloride drying tube was added 454 g. (3.41 moles) of anhydrous aluminum chloride. The suspension was cooled to 25°, 300 g. (282 ml., 3.24 moles) of propionyl chloride was added with stirring, and the mixture was cooled to 5° in an efficient ice-salt bath. The dropping funnel was replaced by an efficient gas dispersion inlet tube and ethylene gas was passed into the stirred reaction mixture until reaction was essentially complete, keeping the temperature below 10° throughout the addition. The time required depends upon the rate of ethylene addition and efficiency of absorption, but was usually five to five and one-half hours under the conditions employed. Then the ethylene flow was stopped and the reaction mixture was allowed to come to room temperature overnight. The mixture was poured onto a mixture of ice and 200 ml. of concentrated hydrochloric acid, mixed well and the organic layer was separated and washed thoroughly with dilute hydrochloric acid and with water. The aqueous layers were re-extracted with chloroform and the combined chloroform extracts were dried over anhydrous calcium chloride.

After removal of the calcium chloride by filtration, it was advantageous not to isolate the intermediate chloroketone XV, but to use the solution which contained ethyl vinyl ketone, as well as 1-chloro-pentanone-3, directly for reaction with the amine. In this example the solution was cooled in an ice bath and 230 g. (3.15 moles) of diethylamine was added in three portions with swirling over a period of ten minutes. Heat was evolved and the addition was regulated so as to maintain the temperature below about 15°. Then the reaction mixture was allowed to stand for eighteen hours at room temperature. The product was removed by washing the solution thoroughly with dilute (approx. 7%) hydrochloric acid in 300 ml. portions, using a total of 2 liters. The acid layers were made alkaline with sodium hydroxide solution, saturated with salt and extracted thoroughly with ether; the ether layers were combined and washed with two portions of saturated salt solution and dried over sodium sulfate. Removal of the ether left an orange oil which on distillation through a modified Claisen flask gave 1-diethylaminopentanone-3, B. P. 82–83.5° at 13 mm., $n_D^{25}$ 1.4327–1.4330.

*Ethyl vinyl ketone*

A solution of 15.7 g. (0.10 mole) of 1-diethyl-aminopentanone-3 in 100 ml. of Dowtherm (see below) was exactly neutralized with 3.5 g. (0.1 mole) of anhydrous hydrogen chloride (adding a small additional amount of the amine, if necessary, to insure the absence of excess hydrogen chloride). This solution was added from a dropping funnel to 50 ml. of Dowtherm (biphenyl-diphenyl ether mixture) in a distilling flask attached to a cooled condenser and receiver. During the addition the temperature of the contents of the distilling flask was maintained at 150°, and the ethyl vinyl ketone distilled from the reaction flask. Finally the temperature of the mixture was raised to 200°. The distillate was redistilled to yield ethyl vinyl ketone, B. P. 93–100° at 734 mm., $n_D^{25}$ 1.4145.

*2-γ-ketopentyl-1,3-cyclohexanedione or enolic form (VIIa or b)*

4–a. ETHYL VINYL KETONE PROCEDURE

A solution of 8.65 g. (0.078 mole) of dihydroresorcinol VIa and 6.5 g. (0.078 mole) of ethyl vinyl ketone in 15 ml. of purified dioxane was placed in a three-necked flask equipped with dropping funnel, stirrer and nitrogen inlet tube. The system was filled with nitrogen and cooled in an ice bath. A solution of 1.5 ml. (0.015 mole) of purified piperidine in 40 ml. of dry, thiophene-free benzene was added over a period of one hour. The solution was then allowed to stand at room temperature for forty-eight hours. At the end of this time the mixture was poured into 50 ml. of 1 N hydrochloric acid, the organic layer separated and the aqueous solution was extracted three times with chloroform. The combined organic extracts were washed twice with saturated sodium chloride solution, and the solvent was removed from the organic layer by distillation, finally under reduced pressure. The residual light yellow oil was made basic with 5% potassium hydroxide solution and extracted once with ether. The alkaline layer was acidified with 5% hydrochloric acid, saturated with sodium chloride and extracted three times with chloroform. The chloroform extract was dried over anhydrous sodium sulfate, concentrated and the residue distilled under reduced pressure to give a viscous, yellow oil, B. P. 125–131° at 0.08 mm. The oil solidified upon standing and the solid was triturated with ether, filtered and recrystallized twice from ether to give colorless clusters of prisms, M. P. 84–85°. Both the oil and the crystals were appreciably soluble in water and gave a purple color with aqueous ferric chloride solution, indicating the presence of the enolic form. The crystals in 95% ethanol gave an absorption maximum at 264 m$\mu$ (log $E$=4.17).

4-b. 1-DIETHYLAMINOPENTANONE-3 METHIODIDE PROCEDURE

To 6.3 g. (0.040 mole) of 1-diethylaminopentanone-3 in a three-necked flask, equipped with a stirrer, dropping funnel and reflux condenser protected with a calcium chloride drying tube, was added methyl iodide in small portions while stirring and cooling in an ice bath until a total of 5.7 g. (0.040 mole) had been added in the course of ten to thirty minutes. The flask was allowed to stand at room temperature for two hours; then 20 ml. of dry ether was added and decanted. To the flask containing the solid methiodide was added 4.43 g. (0.040 mole) of dihydroresorcinol, 12 ml. of purified dioxane and 12 ml. of dry, thiophene-free benzene. The flask was flushed with nitrogen and 1 ml. (0.010 mole) of piperidine was added. After stirring for twenty-four hours under nitrogen the reaction mixture was poured into 60 ml. of 1 N hydrochloric acid, the layers separated and the aqueous layer extracted with five portions of chloroform. The combined organic layers were washed twice with saturated sodium chloride solution, dried over anhydrous sodium sulfate and concentrated under reduced pressure to a light yellow oil. The addition of 20 ml. of dry ether caused the precipitation of 0.55 g. of white salt, M. P. 134–145°, arising from the Mannich base. This solid was removed and the filtrate was concentrated and distilled under reduced pressure to give a viscous, yellow oil, B. P. 120–141° at 0.5 mm. This solidified upon standing and was triturated with ether and filtered to give a solid, M. P. 70–82°.

Improved yields resulted from a similar run carried out as above except using 23 ml. of benzene and no dioxane as the solvent for the reaction, and adding an additional 1 ml. of piperidine after twenty-four hours, with a total reaction time of forty-three hours. The undistilled product consisted of the desired 2-ketopentyl-dihydroresorcinol (VIIa and VIIb) as a mixture of enol and keto isomers.

*3-methoxy-2-γ-ketopentyl-2-cyclohexen-1-one (VIII)*

5-a. FROM CRYSTALLINE 2-γ-KETOPENTYL-1,3-CYCLOHEXANEDIONE (OR ITS ENOL FORM)

To a solution of 2.5 g. (0.013 mole) of the pure 2-γ-ketopentyl-dihydroresorcinol, M. P. 83–85°, in 30 ml. of ether was added in portions a solution of 0.015 mole of diazomethane in ether. The evolution of nitrogen was rapid and immediate. When the reaction was finished, or alternately after the solution was allowed to stand overnight at room temperature, it was concentrated and the residual enol ether was distilled under reduced pressure as a yellow liquid, B. P. 130–137° at 0.2 mm., $n_D^{25}$ 1.5178. The methoxy derivative in 95% ethanol gave an absorption maximum at 265–266 m$\mu$ (log $E$=4.24).

When distilled, but unrecrystallized 2-γ-ketopentyldihydroresorcinol was used, the methoxy derivative obtained had a B. P. 144–147° at 0.3 mm., $n_D^{25}$ 1.5198.

5-b. FROM DIHYDRORESORCINOL WITHOUT ISOLATION OF INTERMEDIATES

In a 500-ml., three-necked, round-bottomed flask equipped with a sealed stirrer, dropping funnel and reflux condenser to which was attached a calcium chloride drying tube, was placed 20.4 g. (0.13 mole) of 1-diethylaminopentanone-3. The flask was cooled in an ice bath and 18.5 g. (0.13 mole) of methyl iodide was added in portions with stirring over a ten-minute period. After an additional forty-five minutes in the cold and forty-five minutes at room temperature, some dry, thiophene-free benzene was added and then decanted. To the methiodide was added 14.5 g. (0.13 mole) of dihydroresorcinol and 20 cc. of dry benzene. The air in the flask and condenser was replaced by nitrogen and a solution of 2.9 ml. of purified piperidine in 20 ml. of dry benzene was added while cooling and stirring. After stirring at room temperature for two hours the red solution was homogeneous and the mixture was allowed to stand at room temperature for a total of twenty-four hours. The reaction mixture was then poured into 120 ml. of 1 N hydrochloric acid, the benzene layer separated and the water layer extracted with several portions of chloroform. The combined organic layers were washed with two portions of saturated salt solution, the latter re-extracted, and the extracts dried over sodium sulfate. After removal of the solvent under reduced pressure, the crude 2-γ-ketopentyldihydroresorcinol was dissolved in 100 ml. of ether, a small amount of solid salts removed and the filtrate was cooled in an ice bath and treated with an ethereal solution of diazomethane prepared from 60 g. of N-nitroso-N-methyl-urea. After the initial vigorous reaction had subsided, the solution was allowed to come to room temperature to insure essentially complete reaction. The solvent was removed under reduced pressure and the residual oily methoxy derivative was purified by distilling under reduced pressure, giving a forerun, B. P. 60–140° (0.3 mm.), containing the methyl enol ether of dihydroresorcinol, and the 10.5 g. of the desired product, B. P. 144–145° (0.2 mm.), $n_D^{25}$ 1.5192. Higher yields may be obtained as indicated above by the addition of a second portion of piperidine during the condensation with the Mannich base methiodide.

*Other variations*

The above examples serve to illustrate the reactions only, as other variations may be employed. Some of the variations are as follows: the use of Mannich bases derived from other secondary amines than diethylamine, including dimethylamine, piperidine, morpholine, etc. The use of other bases than piperidine as the condensing agent, including diethylamine, morpholine, and other basic secondary amines, sodium or potassium alkoxides, including sodium methoxide, etc., and other basic catalysts. It is possible to use other quaternary salts of 1-diethylaminopentanone-3 and even the free base itself (or similar derivatives of other secondary amines) rather than the methiodide as illustrated above. Similarly the solvent may be any of a variety of inert or basic solvents, including dioxane, ethers, tertiary amines, benzene and other hydrocarbons, etc. There are other satisfactory procedures for preparing the methoxy derivative VIII, and other alkoxy (e. g., ethoxy, isopropoxy) or aralkoxy (e. g., benzyloxy) derivatives are suitable for use in the subsequent steps.

*1-methoxy - 5 - methyl-6-keto-2,3,4,6,7,8-hexahydronaphthalene (IX) and $\Delta^{4a-5}$ (or 4a–8a)-5-methyl-octalin-1,6-dione (Xb or Xc or the enolic forms Xa or Xd)*

A methanol solution (310 ml. total volume) containing 8.6 g. of 3-methoxy-2-γ-ketopentyl-2-cyclohexen-1-one and 35 g. of sodium methoxide (2 M in this reagent) was allowed to stand at room temperature under a nitrogen atmosphere for seven hours; as the cyclization proceeded a strong maximum in the ultraviolet absorption spectrum developed at 338 mμ (determined after neutralization). At the end of the cyclization period the solution, which contained 1-methoxy-5-methyl-6-keto-hexahydronaphthalene IX, was poured into 520 ml. of water and 100 ml. of concentrated hydrochloric acid and allowed to stand overnight. The mixture was extracted with five portions of chloroform and the combined extracts were washed with water and dried over sodium sulfate. The solvent was removed under reduced pressure leaving a dark orange oil which solidified rapidly; trituration with ether gave 4.0 g. (55%) of yellow powder, M. P. 95–98°. The compound showed absorption in 95% ethanol with maxima at 242 mμ (log $E$=3.84) and 345 mμ (log $E$=3.89). Another sample, containing a different proportion of the tautomeric isomers, had maxima at 241.5 mμ (log $E$=3.89), 345 mμ (log $E$=3.93) and approximately 420–425 mμ (log $E$=2.99).

The solid was slightly soluble in cold water but dissolved readily in dilute potassium hydroxide to give an intense yellow solution. The compound gave a negative test with alcoholic ferric chloride solution. Upon standing at room temperature the solid slowly changed to a gummy paste and finally to a light yellow liquid.

Other alkaline reagents may be used for the cyclization, and other acidic mixtures for demethylation of the methyl enol ether of the cyclized product. The use of other protecting groups than methyl for the enol ether also is suitable, including other alkyl and aralkyl groups, etc.

*5-γ-ketobutyl-5-methyl-$\Delta^{4a-8a}$-octalin-1,6-dione (XI)*

The methiodide was prepared from 2.7 g. (19 millimols) of 1-diethylaminobutanone-3 and 3.1 g. (22 millimols) of methyliodide as described above, except mechanical stirring was omitted. After washing twice with dry ether and decanting, the methiodide was dissolved in 15 ml. of absolute methanol without warming. To a solution of 0.39 g. (17 milliequivalents) of sodium in 30 ml. of absolute methanol under a nitrogen atmosphere was added 3.0 g. (17 millimols) of the 5-methyloctalindione-1,6 X (or the enolic forms) and allowed to dissolve at room temperature to an orange solution. This solution was added to the solution of the diethylaminopentanone methiodide under an inert atmosphere and the mixture was allowed to stand at room temperature for forty hours. The mixture was then neutralized with dilute acetic acid, an equal volume of water added and the product extracted with four 20 ml. portions of chloroform. The combined extract was washed three times with 5% potassium hydroxide solution, once with water and dried over anhydrous sodium sulfate. After removal of the solvent the residual orange neutral oil was triturated with ether yielding a solid product, M. P. 139–142°. Recrystallization from a mixture of benzene and cyclohexane gave elongated plates, M. P. 142.5–143°. The solid in 95% alcohol showed an absorption maximum at 246 mμ (log $E$=3.93).

In another run material melting at 135–183° was obtained, exhibiting an absorption maximum in 95% alcohol solution at 241.5 mμ (log $E$=3.92). Cyclization (see below) of this product gave the same 4b-methyl-1,2,3,4,4b,5,6,7,9,10- decahydrophenanthrene-1,7-dione, M. P. and mixed M. P. 121–122°, as that obtained by cyclization of the above solid, M. P. 142.5–143°.

From the potassium hydroxide washes in the above run was obtained, after acidification and extraction with chloroform, material crystallizing as a light brown powder, M. P. 199–201°, when triturated with dry ether. This was 5-methyl-6-hydroxy-1-tetralone, identical with a sample prepared from the octalindione derivative. The ultraviolet absorption of this phenolic ketone showed absorption maxima at 231 mμ (log $E$=4.12) and 287.5 mμ (log $E$=4.13).

*4b-methyl-1,2,3,4,4b,5,6,7,9,10-decahydrophenanthrene-1,7-dione (IV)*

A solution of 0.80 g. of 5-γ-ketobutyl-5-methyl-octalindione XI in 25 ml. of methanol containing 2.85 g. of sodium methoxide was allowed to stand at room temperature for four hours under nitrogen. Then the solution was neutralized with dilute acetic acid, diluted with an equal volume of water and extracted three times with chloroform. The chloroform extracts were washed once with water, dried over sodium sulfate and concentrated to a light yellow oil under reduced pressure. Upon standing overnight at 0° with a few drops of ethanol, the oil solidified to yield 0.13 g. of crystals, M. P. 119–120°. Additional tricyclic diketone was obtained from the filtrate. In 95% ethanol an intense absorption maximum was observed at 240 mμ (log $E$=4.407).

*Anal.*—Calcd. for $C_{15}H_{18}O_2$: C, 78.22; H, 7.88. Found: C, 77.96; H, 7.94.

Other alkaline reagents including sodium or potassium hydroxide, other sodium alkoxides, potassium alkoxides including potassium ethoxide and potassium t-butoxide, etc., may also be used to cyclize the triketone to the tricyclic diketone.

Methyl vinyl ketone may be used under mild conditions, also, in preparing the intermediate XI.

Structural formulas of some of the compounds referred to above are given below with their identifying numbers.

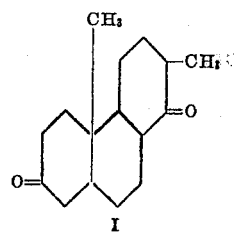

I

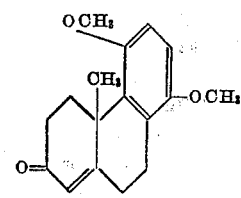

II

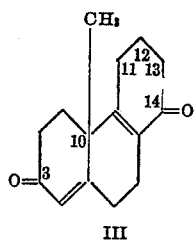

III
(steroid numbering system)

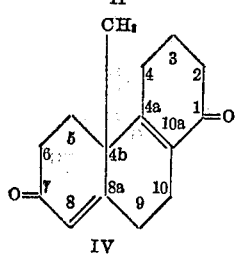

IV
(phenanthrene numbering system)

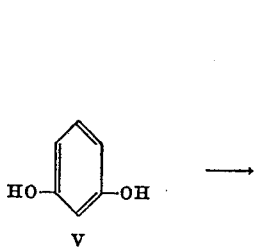

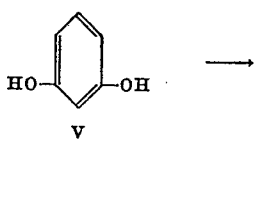

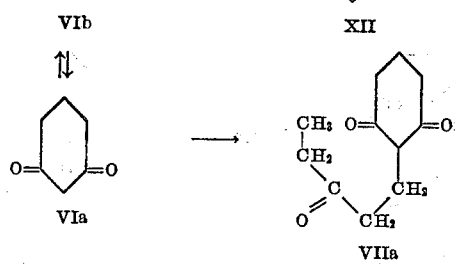

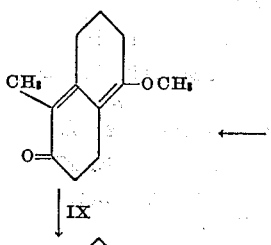

Xa     Xb     Xc     Xd

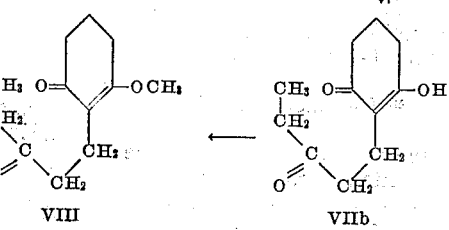

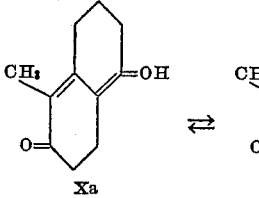

III (or IV)

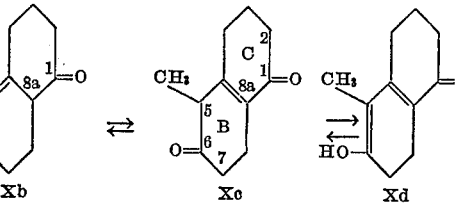

XI

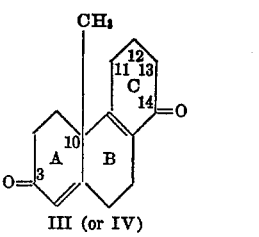

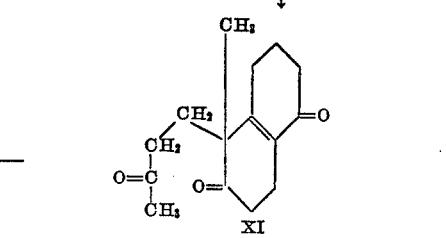

$$CH_3CH_2COCl + CH_2=CH_2 \xrightarrow{AlCl_3} CH_3CH_2COCH_2CH_2Cl \xrightarrow{(C_2H_5)_2NH} CH_3CH_2\underset{\underset{O}{\|}}{C}-CH_2CH_2N(C_2H_5)_2$$

XV     XVI

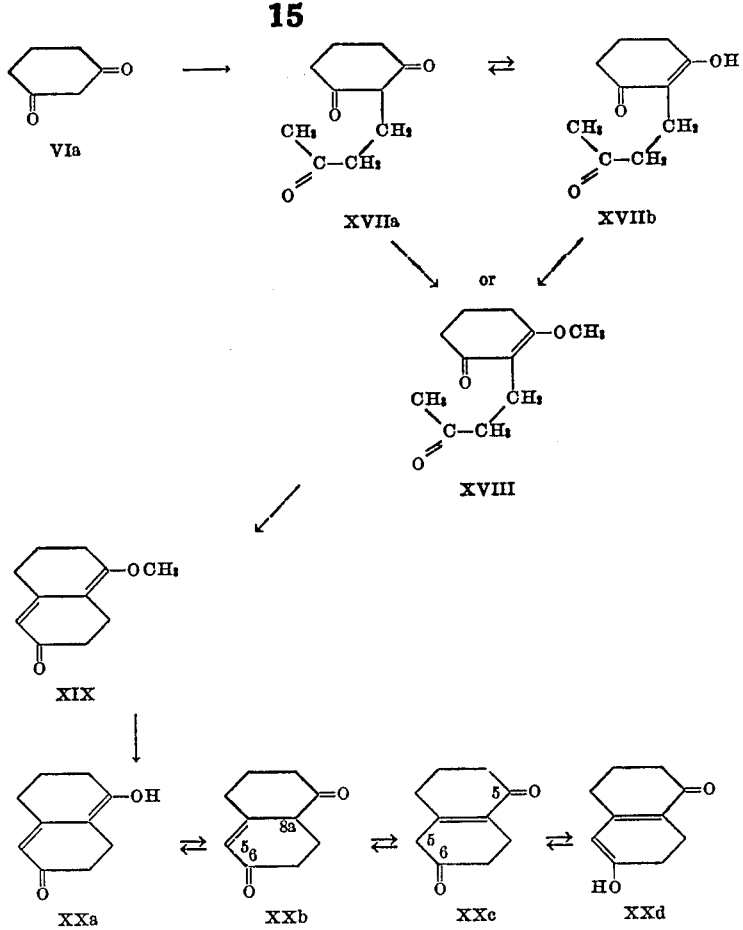

What is claimed is:
1. Compounds selected from the group consisting of $\Delta^{4a-5}$-octalin-1,6-dione; $\Delta^{4a-8a}$-octalin-1,6-dione; $\Delta^{4a-5}$-5-methyl-octalin-1,6-dione; $\Delta^{4a-8a}$-5-methyl-octalin-1,6-dione; and enolic forms of the same.

2. The compound, $\Delta^{4a-8a}$-5-methyloctalin-1,6-dione.

3. The process of making a 5-methyl ketone compound of claim 1 which comprises cyclizing under alkaline conditions the 3-enol ether of 2-γ-ketopentyl-1,3-cyclohexanedione and hydrolyzing under acid conditions the resulting 1-enol ether of $\Delta^{4a-5}$-5-methyloctalin-1,6-dione to form the ketone compound.

References Cited in the file of this patent
UNITED STATES PATENTS

| Number | Name | Date |
|---|---|---|
| 2,542,223 | Wendler et al. | Feb. 20, 1951 |

OTHER REFERENCES

Buchi et al. Helv. Chim. Acta., Vol. 31, pages 241-248 (1948).